United States Patent

Yamauchi et al.

[11] Patent Number: 5,974,448
[45] Date of Patent: *Oct. 26, 1999

[54] AUTOMATIC TRANSFER FOR ELECTRONIC MAIL USING AN AUTOMATIC TRANSFER NAME AS A KEYWORD

[75] Inventors: Toshiki Yamauchi; Hiroshi Yamaguchi, both of Shizuoka, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/723,124

[22] Filed: Sep. 30, 1996

[30] Foreign Application Priority Data

Mar. 1, 1996 [JP] Japan ................................. 8-044537

[51] Int. Cl.⁶ ...................................................... G06F 17/00
[52] U.S. Cl. ........................................................... 709/206
[58] Field of Search ..................................... 370/312, 389; 379/89, 93.01, 93.24; 395/200.36, 200.37, 200.68, 200.73, 200.75; 709/206

[56] References Cited

PUBLICATIONS

Bryan Castales with Eric Allman & Neil Rickert, Sendmail, O'Reilly & Associstes, Inc,3,29,299,300, and 301, 1993.

*Primary Examiner*—Ellis B. Ramirez
*Attorney, Agent, or Firm*—Staas & Halsey LLP

[57] ABSTRACT

A system for automatic transfer of electronic mail which can set and modify the automatic mail transfer operation without requiring users to learn the operating method or requiring the system manager to set up the transfer. The mail handler retrieves the user address books of the intended receivers of a mail message using an automatic transfer destination name as a keyword and transfers the message to the user corresponding to the automatic transfer destination name when the keyword exists in the user's address book.

9 Claims, 5 Drawing Sheets

PRESIDENT: user - 001
MANAGER OF DEPARTMENT OF SALES: user - 002
MANAGER OF DEPARTMENT OF DEVELOPMENT: user - 003
MANAGER OF DEPARTMENT OF ACCOUNTING: user - 004
MANAGER OF DEPARTMENT OF GENERAL AFFAIRS: user - 005
MANAGER OF DEPARTMENT PERSONAL AFFAIRS: user - 006

AUTOMATIC TRANSFER FOR ELECTRONIC MAIL USING AN AUTOMATIC TRANSFER NAME AS A KEYWORD

CROSS REFERENCE TO RELATED APPLICATIONS

This application is based upon and claims priority from Japanese Patent Application 8-044537 filed Mar. 1, 1996, the contents of which are incorporated herein by reference herein.

BACKGROUND OF THE INVENTION

1. Field of the Invention

The present invention relates to an automatic transfer system for electronic mail and, more particularly, is directed to an e-mail system that automatically alters destination addresses when a senders address book includes a transfer indication keyword.

2. Description of the Related Art

Automatic transfer of electronic mail (e-mail) allows mail sent from a sender to one user to be automatically transferred to another user. The need for automatic transfer arises, for example, when an electronic mail user cannot attend to received electronic mail due to a long term absence in which case the user's mail needs to be forwarded to another user who has been appointed as a proxy.

To effect an automatic transfer of mail, typically either the user or system manager must set up the transfer operation using a specialized method or program. In general, the need to set up an automatic transfer of electronic mail arises infrequently. Thus, the user typically has no or very little experience in setting up the automatic transfer operation. It is also difficult for a user who has no previous experience in automatically transferring mail, to learn for the first time the method required for setting-up the automatic transfer of e-mail. An additional burden can also be placed on the e-mail system manager who must in certain cases set up the operation and collect the user's data. In conventional electronic mail systems, the set up operation for initializing the transfer of e-mail to a different destination is done manually using a program specialized for the task.

SUMMARY OF THE INVENTION

It is an object of the present invention to implement an electronic mail system which can automatically set up and modify automatic transfer operations for electronic mail and thereby release the user from the burden of learning new operations and lessen the workload of the e-mail system manager.

To attain the above-mentioned objects, the present invention provides an automatic transfer system for handling mail in a computer based electronic mail system which takes an electronic mail message originally intended to be sent to one user and automatically transfers the message to alternate users. The system includes address books for management of destination names and corresponding mail addresses for each user of the system. The system also includes a mail handler for retrieving the address book of a recipient and scanning the address book using an automatic transfer destination name as a keyword and transferring the mail message to the mail address corresponding to the automatic transfer destination name.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is directed to an automatic transfer system for electronic mail (e-mail) in an electronic mail system provided by a computer. If an electronic mail user (designated as user A) cannot read the electronic mail received for the user and thereby cannot execute a job requested by the e-mail because of a long-term absence or some other condition, completion of the job is requested by automatically transferring the electronic mail addressed to the user A to another user (designated as user B) who has been appointed as a proxy for user A. For the transfer of electronic mail to a proxy in the electronic mail system, the information required for a transfer is provided using a changeable keyword.

Figure 1:
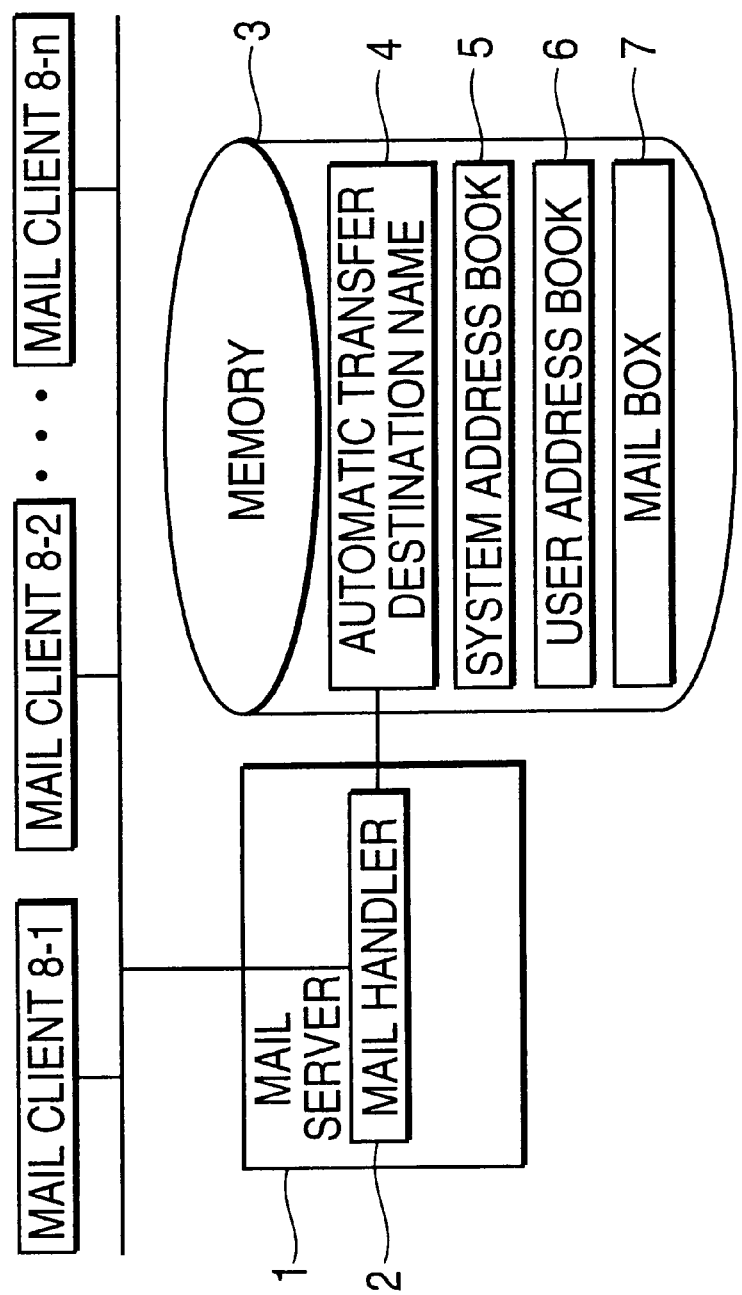
FIG. 1 is a system diagram.

FIG. 1 is a system diagram illustrating the present invention. In this figure, a mail server 1 is used to process the e-mail while a mail handler program 2 executed by the mail server 1 processes the mail. An external memory 3 is provided for storing various pieces of information including an automatic transfer destination name 4 which is modifiable by the system manager and identifies a keyword used to designate a transfer. Also included is a system address book 5 for storing system addresses, a user address book 6 provided for each user, and a mail box 7 for managing received mail for each user. The system also includes mail clients 8-1, 8-2, . . . , 8-n which are typically desk top type computers and which are connected to the mail server 1 via a transmission line.

For a user to transmit mail to other users, a mail client 8 first logs into the mail server 1. The mail server 1 is a server computer dedicated to e-mail processing. A unique login name is assigned to each user and this login name is used as the mail address of the user.

Next, the user sends mail (e-mail) from the mail client 8 which is then processed by mail server 1. The mail to be transmitted to the mail server 1 from the client 8 includes a mail header having fields for the sender, one or more receivers, and a body containing text or other information to be sent to the receiver.

Figure 2:
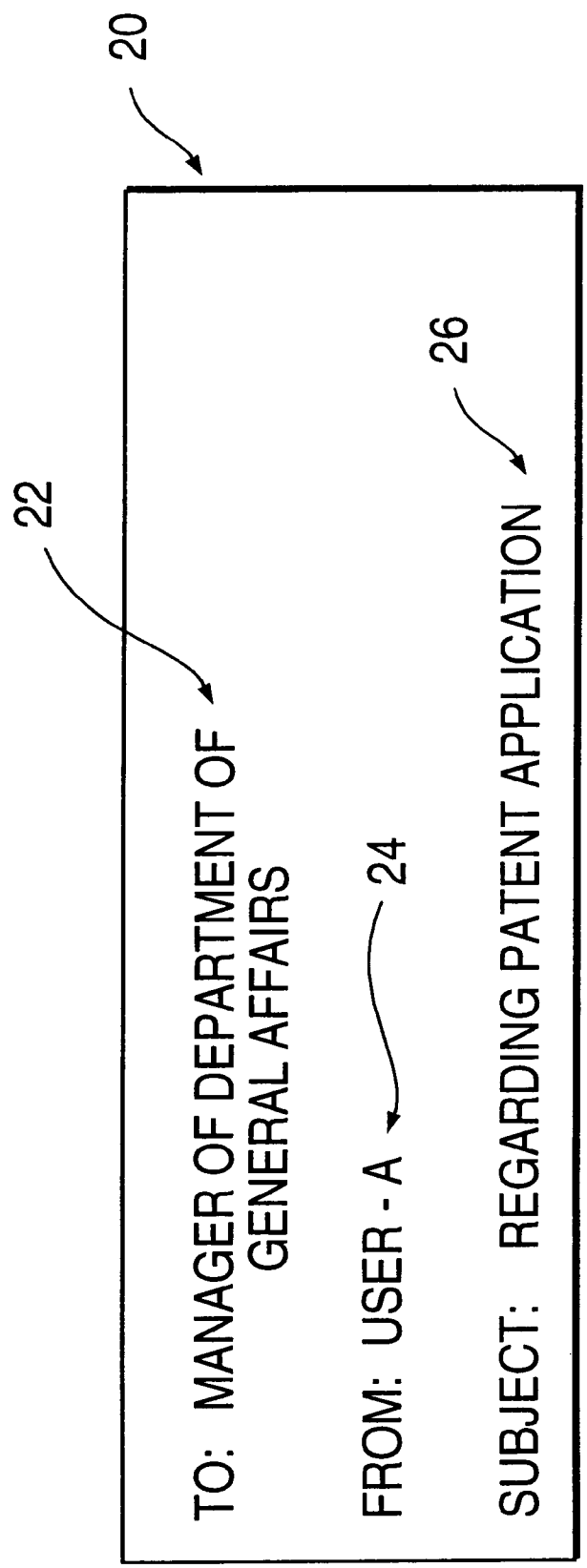
FIG. 2 is a diagram illustrating an example of a mail header.

An example of a mail header 20 is shown in FIG. 2. The character string following "To:" in the first line of FIG. 2 indicates a destination name 22. The destination name 22 includes one or multiple login names (actual mail addresses of receivers) or destination names (character strings) listed in an address book. The second line beginning with "From:" includes a character string 24 that designates the sender of the e-mail. The character string 24 following "From:" particularly indicates the mail address, that is, login name of the sender. The third field beginning with "Subject:" includes a string 26 which designates a title or subject of the mail. The example shown in FIG. 2 indicates a mail message with the title or subject "Regarding Patent Application". This message originates from "user-a" and is sent to "Manager of Department of General Affairs". The Manager of Department of General Affairs is listed in a system address book 30 of user-a (see FIG. 4).

An address book indicates a correspondence between a destination name and a mail address (that is, a login name). The system has two types of address books: a user address book 40 (see FIG. 4) which is provided for and individually used by each user and a system address book 30 (see FIG. 3) which is used in common by all users of the e-mail system. Each user has a private user address book 40 which that user can freely modify. The system address book 30 makes it easy to change the definition of relationships between destination names and mail addresses. If a system address book 30 did not exist, all definitions of relationships between destination names and mail addresses would have to be defined in each user book 40 even though some definitions are common for all users. Consequently, every user address book 40 would have to be updated when a common definition is changed. In the present invention, only the system address book needs to be updated.

Figure 3:
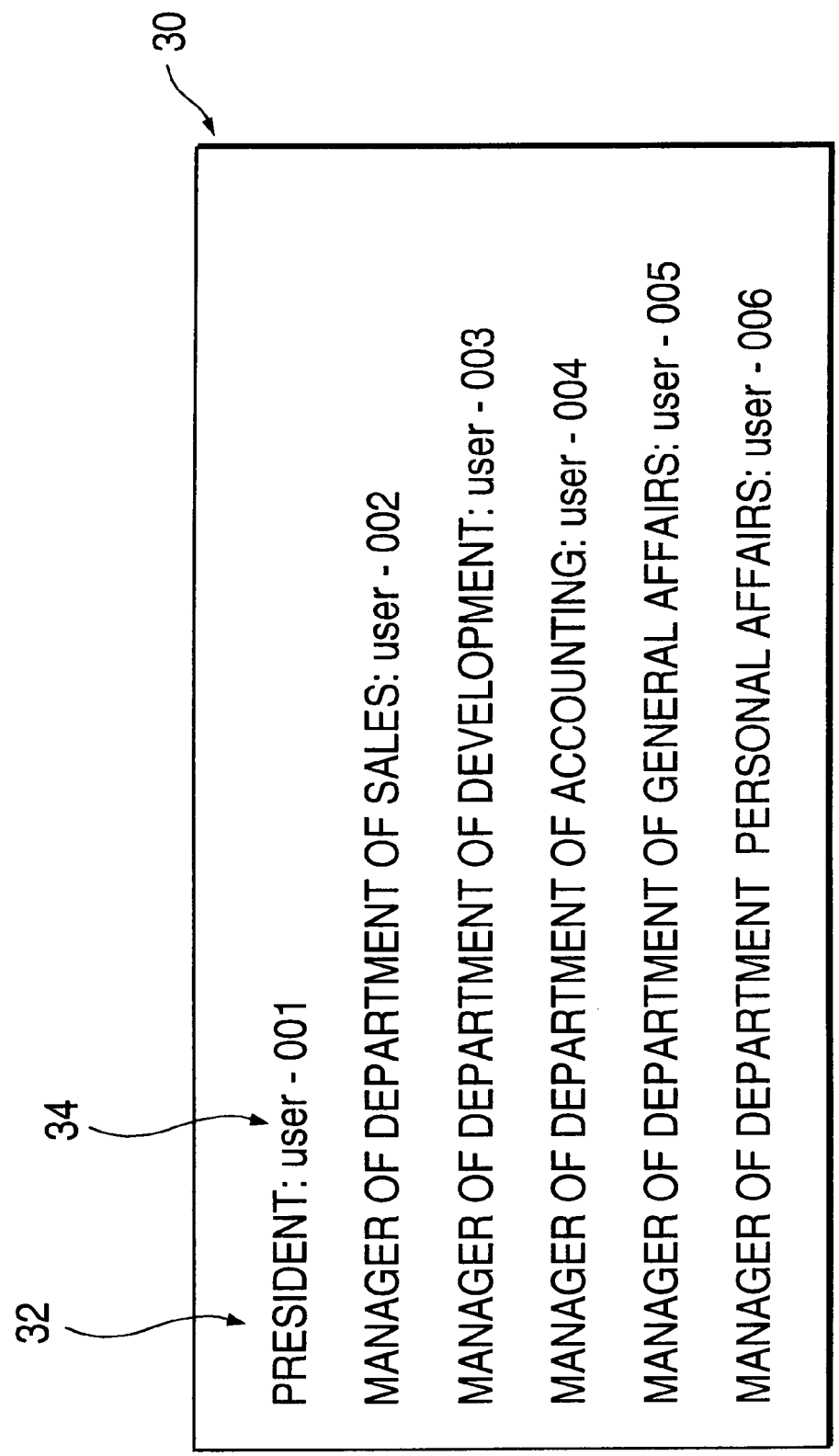
FIG. 3 is a diagram illustrating an example of a system address book.
Figure 4:
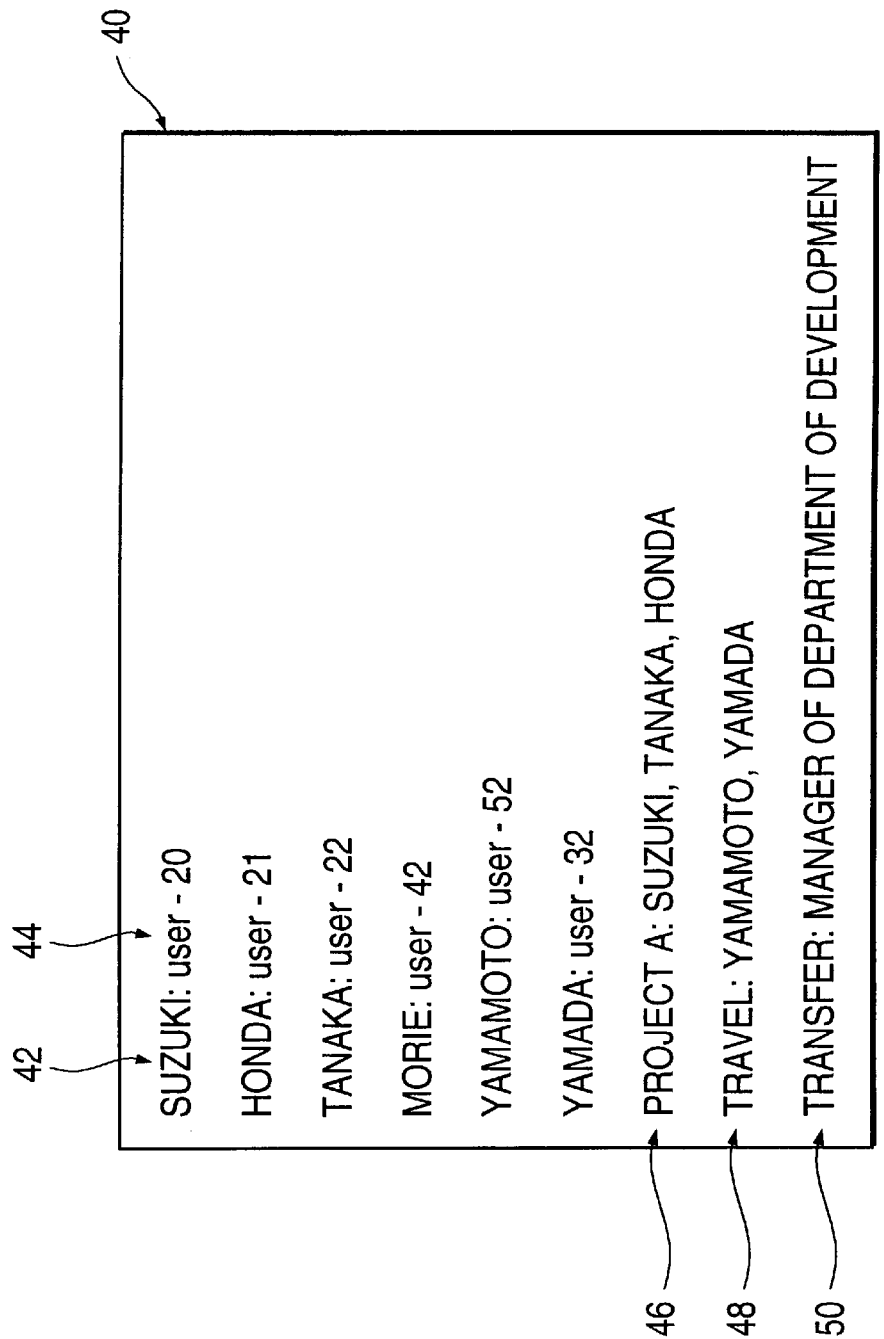
FIG. 4 is a diagram illustrating an example of a user address book.

FIG. 3 shows an example of a system address book 30, while FIG. 4 shows an example of a user address book 40. Both the system address book 30 and the user address books 40 are used for management of the destination name information and have the same format. The left side of the colon (":") of each line indicates the destination name, while the right side of the colon indicates an actual mail address (login name) corresponding to each destination name. A plurality of corresponding mail addresses can be designated for one destination name. Moreover, the other corresponding destination names defined in the same address book may also be defined in place of the mail address. In addition, a destination name defined in the system address book 30 can also be used in the user address book 40.

In the system address book 30 shown in FIG. 3, for example, a corresponding mail address (login name) 34 "user-001" is designated for the destination name 32 "President", while a corresponding mail address (login name) 34 "user-002" for the destination name 32 "Manager of Department of Sales", a corresponding mail address (login name)34 "user-003" for the destination name 32 "Manager of Department of Development", a corresponding mail address (login name) 34 "user-004" for the destination name 32 "Manager of Department of Accounting", a corresponding mail address (login name) 34 "user-005" for the destination name 32 "Manager of Department of General Affairs" and a corresponding mail address (login name) 34 "user-006" for the destination name 32 "Manager of Department of Personal Affairs".

Moreover, in the user address book 40 shown in FIG. 4, the mail address (login name) 44 "user-20" corresponds to the destination name 42 "Suzuki", while the mail address (login name) "user-21" corresponds to the destination name "Honda", the mail address (login name) "user-22" to the destination name "Tanaka", the mail address "user-42" to the destination name "Moire", the mail address (login name) "user-52" to the destination name "Yamamoto" and the mail address (login name) "user-32" to the destination name "Yamada", respectively in the first line to the sixth line.

In the seventh line 46 of book 40, the mail addresses (login names) "user-20", "user-22", "user-21" correspond to the destination name "Project A" using the destination names "Suzuki", "Tanaka", "Honda".

In the eighth line 48 of book 40, the mail addresses (login names) "user-52" and "user-32" correspond in direct to the destination name "Travel" using the destination names "Yamamoto", "Yamada".

Moreover, in line 50 of book 40 the mail address (login name) "user-003" corresponds to the destination name "Transfer" using the destination name "Manager of Department of Development" defined in the system address book indicating that an automatic transfer is required to mail received by this user. "Transfer" is a system keyword that matches the automatic transfer destination name 4.

Figure 5:
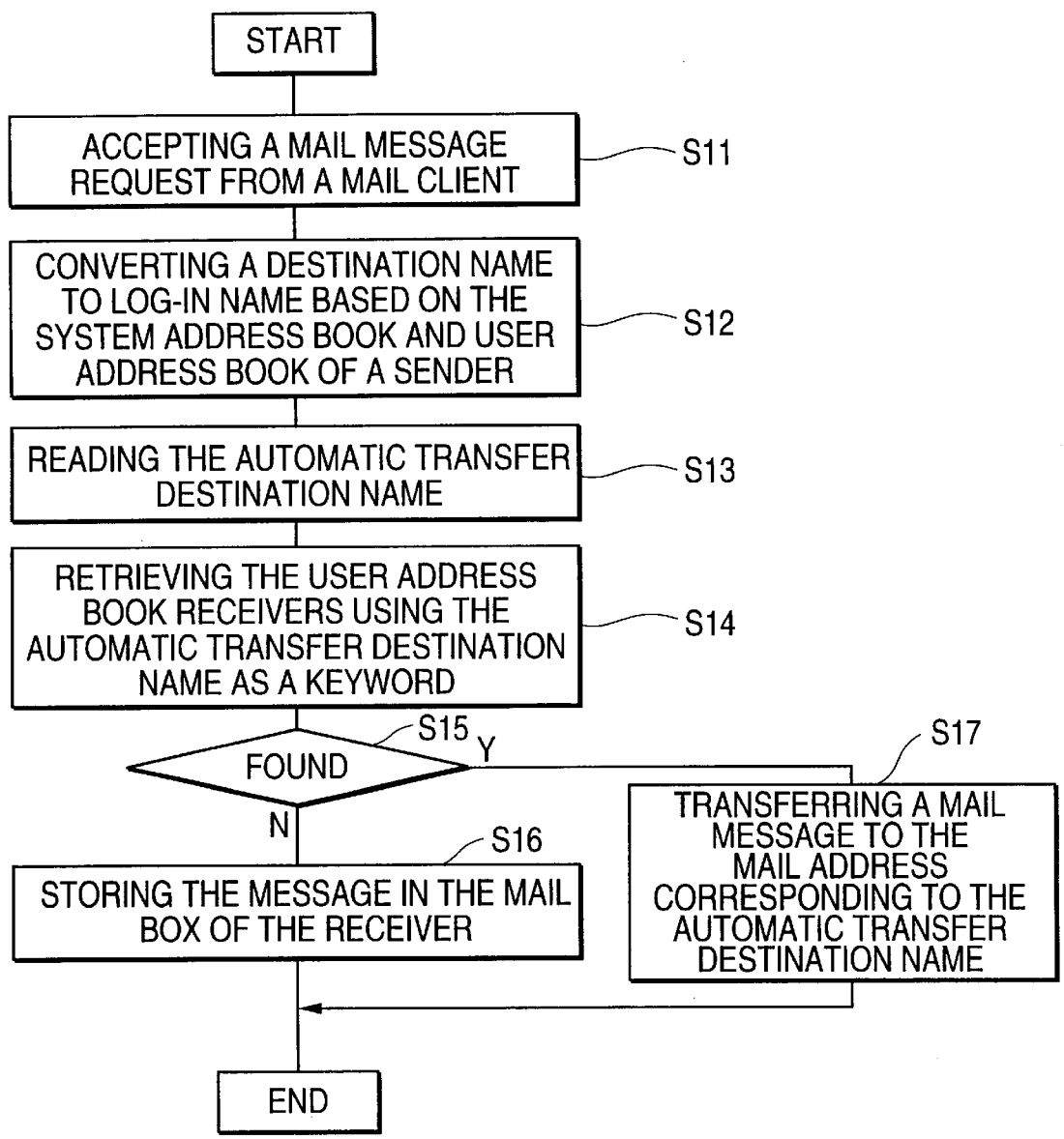
FIG. 5 is a flowchart illustrating a process flow of a mail handler.

The processing steps of the mail handler 2 will now be explained (using FIG. 5).

The process begins when a user (sender) sends a mail message from a mail client 8 (step S11). The mail handler 2 of the mail server 1 receives the message. The mail handler 2 parses the "From:" field of the mail header of the message to identify the user's address and retrieves the user's address book corresponding to the user's address.

Based on the identified user address book 40 and system address book 30, all destination names in the "To:" field are converted into mail addresses (step S12). When an actual mail address (login name) is designated in the "To:" field, the name conversion is not carried out.

Next, the automatic transfer destination name 4 or keyword that system wide indicates that a transfer is to be performed is read from external memory 3 (step S13).

The user address book 40 corresponding to the mail address obtained in step S12 is retrieved for each receiver and scanned using the automatic transfer destination name 4 as a keyword (step S14).

The automatic transfer destination name will either be listed or not listed (step S15). "Found" in step S15 means that the retrieval of step S14 found an entry in the user's address book which has a destination name equal to the automatic transfer destination name 4, that is, there is a keyword match.

When the automatic transfer destination name 4 is not listed, the mail message is stored (step S16) in the mail box corresponding to the mail address, that is, in the receiver's mail box. When the automatic destination name 4 is listed, the mail message is transferred (step S17) to the mail address corresponding to the destination. The mail address is obtained in the same manner as step S12.

The operation of the mail handler will now be illustrated by an example of the processing when the message of FIG. 2 is sent.

First to be considered is the case where the automatic transfer destination name is "Transfer". In step S11, the mail handler receives the message of FIG. 2. In step S12, the mail handler 2 indexes into the system address book 30 of FIG. 3 using the name "Manager of Department of General Affairs" taken from the "To" field of the message and thus retrieves the mail address "user-005". In step S13, the automatic transfer destination name is read to obtain "Transfer" (step S13). In step S14, the user address book corresponding to "user-005" is retrieved and scanned. In step S15, the keyword "Transfer" is found in the user's address list (FIG. 4) which switches control to step S17. In step S17, since "Transfer: Manager of Department of Development" is listed in the system address book of the login name "user-003", the mail message is transferred to the Manager of the Department of Development (that is, "user-003").

As another example, consider the case where "Moire" is listed as the automatic transfer destination name 4 or system keyword designating a transfer.

Again, a user "user-a" requests (step S11) the mail server 1 to originate a mail message having the mail header shown in FIG. 2 from a mail client 8, the mail handler accepting the request. The mail handler 2 indexes (step S12) into the system address book 30 (FIG. 3) using the name "Manager of Department of General Affairs" taken from the "To" field of the message thus retrieving the mail address "user-005". Next, the automatic transfer destination name is read (step S13) to obtain "Moire". Then, the user address book corresponding to "user-005" is retrieved and scanned for the keyword (step S14). In step S15, "Moire" is listed in the user address book 40 of "user-005" switching control to step S17. The mail message is then transferred (step S17) to the mail address "user42".

Here, only user-005 has been discussed as the mail receiver. But when the automatic transfer destination name is changed, the automatic transfer destinations of the mail of other users can all naturally be changed. That is, in the above example, if "Moire: user-234" were registered, for example, in the user address book of the login name "user-123", a mail addressed to "user-123" would be transferred to "user-234". Further, a login name has been used as the mail address in the description, a name other than the login name may be used so long as it is a unique name for each user.

In accordance with the present invention, an exclusive operation or program for designating automatic transfer of e-mail is not required when a user indicates the automatic transfer destination of his e-mail and the automatic transfer destination of e-mail can be registered using the experience gained by the user in setting destinations in the user's address book and a user is not required to learn a new operating method. The automatic transfer destinations of all users can quickly and easily be modified by only modifying the automatic transfer destination name, the work load on the e-mail system manager is reduced and operation efficiency is improved.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

REFERENCE NUMBER LIST 1 mail server
2 mail handler
3 external memory
4 automatic transfer destination name
5 system address book
6 user address book
7 mail box
8-1 mail client
8-2 mail client
8-n mail client
20 head
22 receiver
24 sender
26 subject
30 system address book
32 destination name
34 mail address
40 user address book
42 destination name
44 mail address
46 project destination name
48 travel destination name
49 transfer destination name
S11–S17 process steps

What is claimed is:

1. An automatic transfer unit for handling electronic mail in a computer electronic mail system which takes an electronic mail message originally intended to be sent to one user and automatically transfers said message to alternate users, comprising:

address books provided for each user of the system to manage a plurality of entries, each entry including one or more destination names having corresponding mail addresses; and a mail handler to retrieve and search said address books for a keyword, and to transfer the mail message to the mail address corresponding to said keyword, wherein the keyword corresponds to a destination name of the address books and modification of said keyword is unified with modification of said address books.

2. An automatic transfer unit as set forth in claim 1, further comprising an external memory and wherein automatic transfer destination names are stored in said external memory.

3. An automatic transfer unit as set forth in claim 1, wherein said automatic transfer destination names are updatable.

4. An automatic transfer unit, comprising:

address books including destination names having corresponding mail addresses;

transfer destination name memory means for management of a transfer destination name for transfer of mail; and a mail handler to retrieve the address books, search for the transfer destination name stored in the transfer destination name memory means, and transfer mail to a mail address corresponding to said transfer destination name when said transfer destination name is found, wherein the transfer destination name corresponds to a destination name of the address books and modification of said transfer destination name is unified with modification of said destination name.

5. A method for handling a mail message, comprising the steps of:

receiving the mail message originated from a sender;

converting a destination name of the mail message to a mail address based on a system address book and a plurality of user address books, each including one or more destination names having corresponding mail addresses;

reading an automatic transfer destination name that corresponds to a destination name of the address books;

automatically modifying the automatic transfer destination name in response to modification of the destination name;

retrieving the user address book of each receiver and searching for the automatic transfer destination name; and either storing the message in a mail box of the receiver, or transferring the message to a mail address corresponding to the automatic transfer destination name.

6. An e-mail system, comprising:

a storage unit storing a user's address book including a keyword designating transfer of the user's e-mail to a destination, and one or more destination names having corresponding mail addresses; and an e-mail server coupled to said storage unit, checking the user's address book for the keyword and transferring the e-mail to the destination when the user's address book includes the keyword, wherein the keyword corresponds to a destination name of the user's address book so that modification of the keyword is unified with modification of the destination names.

7. An e-mail process, comprising:

designating a keyword indicating e-mail transfer;

scanning a receiver's address book, containing destination names and corresponding mail addresses, for the keyword;

transferring the e-mail to a destination associated with the keyword when the keyword is in the receiver's address book; and storing the e-mail in the receiver's mail box when the keyword is not in the receiver's address book, wherein the keyword is a destination name and modification of the destination names is unified with modification of the keyword.

8. An automatic transfer unit to transfer electronic mail from a receiver to an automatic transfer destination, comprising:

user address books that include a destination name and a corresponding mail address; and a mail handler to search a user address book corresponding to the receiver, and to transfer the mail to a mail address corresponding to a destination name of the user address book defined as a keyword, wherein the automatic transfer destination of the user address books can be modified by changing the keyword in response to modification of the destination name so that modification of the automatic transfer destination is unified with modification of the destination names.

9. An automatic transfer unit for handling electronic mail between a plurality of users and transferring electronic mail from a receiver to a designated automatic transfer destination, comprising:

user address books that each include a destination name and a corresponding mail address defined by a corresponding user; and a mail handler to search a user address book corresponding to the receiver, and to transfer the mail to a mail address corresponding to a destination name of the user address book that is defined as a keyword, wherein the automatic transfer destination is designated by each of the plurality of users in a manner similar to the defining of the destination name so that modification of the destination name is unified with modification of the keyword.

* * * * *